United States Patent [19]

Martin et al.

[11] Patent Number: 5,028,484

[45] Date of Patent: Jul. 2, 1991

[54] PRESSURE-SENSITIVE ADHESIVE

[75] Inventors: Michael K. Martin; John D. Moon; Francis M. Stark, all of St. Paul, Minn.

[73] Assignee: Minnesota Mining and Manufacturing Company, St. Paul, Minn.

[21] Appl. No.: 489,480

[22] Filed: Mar. 6, 1990

Related U.S. Application Data

[63] Continuation-in-part of Ser. No. 327,407, Mar. 23, 1989, abandoned, which is a continuation of Ser. No. 85,938, Aug. 14, 1987, abandoned.

[51] Int. Cl.[5] ........................ B32B 27/00; B32B 7/12; B32B 15/04; C08L 31/00

[52] U.S. Cl. .................................... 428/352; 428/355; 428/461; 428/483; 428/523; 522/109; 525/190; 525/193

[58] Field of Search .................... 522/3, 109; 428/412, 428/352, 355; 525/190, 193

[56] References Cited

U.S. PATENT DOCUMENTS

| | | | |
|---|---|---|---|
| Re. 24,906 | 12/1960 | Ulrich | 296/59 |
| 4,077,926 | 3/1978 | Sanderson et al. | 260/29.6 |
| 4,181,752 | 1/1980 | Martens et al. | 427/54.1 |
| 4,243,500 | 1/1981 | Glennon | 204/159.12 |
| 4,303,485 | 12/1981 | Levens | 204/159.24 |
| 4,330,590 | 5/1982 | Vesley | 428/336 |
| 4,364,972 | 12/1982 | Moon | 427/54.1 |
| 4,391,687 | 7/1983 | Vesley | 204/159.16 |
| 4,418,120 | 11/1983 | Kealy et al. | 428/343 |
| 4,500,683 | 2/1985 | Hori et al. | 524/533 |
| 4,599,265 | 7/1986 | Esmay | 428/355 |
| 4,645,711 | 2/1987 | Winslow et al. | 428/355 |
| 4,711,781 | 12/1987 | Nick et al. | 428/335 |

OTHER PUBLICATIONS

Handbook of Pressure-Sensitive Adhesive Technology, Van Nostrand Reinhold Co., NY 1982 pp. 353-369; J. Schlademan.

*Primary Examiner*—Marion E. McCamish
*Assistant Examiner*—Susan Berman
*Attorney, Agent, or Firm*—Gary L. Griswold; Walter N. Kirn; Darla P. Neaveill

[57] ABSTRACT

A pressure-sensitive adhesive is provided. The adhesive comprises (a) about 50 to 95 weight percent of an ultraviolet radiation polymerized polymer of (i) one or more monomers which are predominantly alkyl acrylate, the alkyl groups of which have an average of 4 to 12 carbon atoms and (ii) about 0 to 15 weight percent of one or more strongly polar copolymerizable monomers or about 0 to 30 weight percent of one or more moderately polar copolymerizable monomers; and (b) about 5 to 50 weight percent of one or more tackifying resins. The tackifying resins are aromatic polymeric resins which have a number average molecular weight of about 300 to 2500, a polydispersity index of less than about 5, a glass transition temperature of about 40° to 120° C., and a solubility parameter of about 7 to 9.5 $(cal/cc)^{-\frac{1}{2}}$. The adhesive has a monomer conversion factor off at least 98%, and has good storage stability, i.e., losing no more than 70% of its adhesion when aged for a period of two weeks at 70° C.

8 Claims, No Drawings

PRESSURE-SENSITIVE ADHESIVE

This application is a continuation-in-part of U.S. Ser. No. 07/327,407, filed Mar. 23, 1989, now abandoned, which was a continuation of U.S. Ser. No. 07/085,938, filed Aug. 14, 1987, now abandoned.

BACKGROUND OF THE INVENTION

1. Field of the Invention

This invention relates to pressure-sensitive adhesives and adhesive tapes, particularly acrylic pressure-sensitive adhesives and adhesive tapes cured by ultraviolet radiation.

2. Description of the Related Art

The acrylate copolymer pressure-sensitive adhesives, with which the present invention is concerned, are well-known in the art (see for example in U.S. Pat. No. Re. 24,906 Ulrich). They are generally copolymers of a major proportion of alkyl esters of acrylic acid (the alkyl group containing from about four to fourteen carbon atoms) and a minor proportion of at least one modifying monomer such as acrylic acid, methacrylic acid, acrylamide, acrylonitrile, methacrylonitrile, N-substituted acrylamides, hydroxy acrylates, N-vinyl pyrrolidone, maleic anhydride or itaconic acid. They are among the most widely utilized adhesives in the manufacture of pressure-sensitive tapes for a variety of reasons including the ready availability and relatively low cost of the monomeric precursors which react easily to form copolymers that possess a good balance of tack, peel, and shear properties.

U.S. Pat. No. 4,181,752 (Martens et al.) discloses a process for making pressure-sensitive adhesive tape which involves the photopolymerization of the alkyl esters of acrylic acid and the modifying monomers to form the acrylate copolymer. Martens et al. disclose that the intensity and spectral distribution of the irradiation must be controlled in order to attain desirably high cohesive strength and also to attain high peel resistance. It teaches that the polymerizable mixture should be subjected to radiation in the near ultraviolet region at a rate of irradiation in the 300–400 nanometer wavelength range of not more than 7 milliwatts per square centimeter of the mass exposed. Any radiation shorter than 300 nanometers is limited to not more than about 10% of the energy in the 300–400 nanometers. The irradiation is preferably carried out in the absence of air and oxygen which inhibit the polymerization reaction. Thus, it is normally carried out in an inert atmosphere such as nitrogen, carbon dioxide, helium, argon, etc. Air can also be excluded by sandwiching the liquid polymerizable mixture between layers of solid sheet material and irradiating through the sheet material.

Additional patents further disclose ultraviolet radiation polymerization of acrylate adhesives using the process of Martens et al. U.S. Pat. No. 4,303,485 (Levens) discloses the addition of an oxidizable tin salt to the polymerizable mixture which is to be subjected to ultraviolet radiation polymerization to permit polymerization of thick layers in the presence of oxygen and to allow an unusual tolerance of oxygen when polymerizing thin layers. U.S. Pat. No. 4,364,972 (Moon) discloses the use of 15 to 50 parts by weight N-vinyl pyrrolidone as the modifying monomer in the ultraviolet radiation polymerizable mixture to provide a pressure-sensitive adhesive tape which has both high adhesion and high cohesion values and adheres strongly to automotive paints and to rubber and plastic foam layers. U.S. Pat. No. 4,391,687 (Vesley) discloses the use of specified chromophore-substituted-halomethyl-s-triazines as photoactive crosslinking agents in the ultraviolet radiation polymerizable monomer mixture with these triazines having good solubility in the monomer mixture and reduced tendency to yellowing and providing improved tolerance to oxygen during polymerization. U.S. Pat. No. 4,599,265 (Esmay) discloses a readily peelable pressure-sensitive adhesive tape, the adhesive layer of which is an ultraviolet radiation polymerized alkyl acrylate polymer which is crosslinked and nearly free from polar substituents. These patents also suggest that such conventional additives as tackifiers may be included in the adhesive, but do not exemplify this teaching.

The above-cited Moon patent, which concerns pressure-sensitive adhesive designed especially to provide enhanced adhesion to automotive paints, teaches that tackifiers can be blended into the photoactive mixtures of monomers from which those pressure-sensitive adhesives are photopolymerized, but warns that "the addition of any such material adds complexity and hence expense to an otherwise simple, straight forward, economical process and is not preferred except to achieve specific results" (col. 6, lines 3–12). The Moon patent does not exemplify this teaching. However, the introduction of a tackifier into a photopolymerizable mixture of monomers often interferes with the polymerization and prevents the attainment of the desired adhesive and cohesive properties.

U.S. Pat. No. 4,243,500 (Glennon) discloses a pressure-sensitive adhesive formed from a composition comprising mono-functional unsaturated acrylate ester monomer, essentially saturated tackifying resin polymer dissolved in the acrylate ester, non-crystallizing elastomeric material also dissolved in the acrylate ester, and an initiator responsive to ultraviolet light or other penetrating radiation such as electron beam, gamma, or X-ray radiation. Glennon discloses use of ultraviolet light within a wavelength range of between about 1800 and 4000 Angstroms and desirably between about 3500 and 3600 Angstroms. The adhesive composition is coated on a substrate and exposed to 200 watt per inch ultraviolet lamps. The intensity of these 200 watt per inch lamps taught by Glennon is much greater than the lamps disclosed by Martens et al. which provide an intensity of about 1 watt per lineal inch. Glennon discloses that the essentially saturated tackifying resin polymer can be a substance or mixture of substances selected from the group consisting of esters of rosin, hydrogenated esters of rosin, modified rosin esters, esters of polymerized rosin, esters of hydrogenated rosin, hydrocarbon resin, linear homo polymers of alpha-methyl styrene, alpha-pinene terpene hydrocarbon resin, aromatic modified C-5 hydrocarbon resin, vinyltoluene alpha methyl styrene copolymer resins, beta-pinene terpene resins, polycyclic hydrocarbon resins and technical hydroabietyl alcohol. However, many of these essentially saturated resin polymers are unsuitable for use in the curing method of the above-cited Martens patent due to incompatibility, which results in phase separation of the tackifying resin from the monomer mixture, excessive UV absorption which retards the photochemical reaction, and high reactivity with the monomers such that polymerization of the monomers is impeded.

U.S. Pat. No. 4,500,683 (Hori et al.) discloses a pressure-sensitive adhesive composition containing as a polymer component, an addition-polymerization polymer of an acryl-based polymer having sticking properties at room temperature and one or more ethylenically unsaturated monomers capable of forming a homo- or copolymer having a glass transition point of at least 273° K. The addition-polymerization polymer is prepared by polymerizing one or more ethylenically unsaturated monomers in the presence of the acryl-based polymer by solution polymerization or bulk polymerization using radical polymerization catalysts, but polymerization can be initiated by energy in the form of light, electron rays, etc. Compounding agents such as a coloring agent, a filler, an anti-aging agent, a tackifier, etc. can be added.

U.S. Pat. No. 4,418,120 (Kealy et al.) discloses a pressure-sensitive adhesive tape which is made by coating a sheet backing with a solution of isooctyl acrylate:acrylic acid copolymer containing a tackifying rosin ester and an antioxidant, evaporating the solvent, and crosslinking the adhesive. U.S. Pat. No. 4,645,711 (Winslow et al.) discloses a removable pressure-sensitive adhesive tape, the adhesive layer of which is an emulsion polymerized copolymer of alkyl acrylate such as isooctyl acrylate and a small amount of emulsifier monomer and a tackifying resin selected from hydrogenated rosin esters, polyterpene, polymerized alkyl styrene, and polymerized petroleum-derived monomer resins. Although tackifying resins, such as the rosin esters have been successfully used with solution and emulsion polymerized acrylate pressure-sensitive adhesives and polyterpene, polymerized alkyl styrene, and polymerized petroleum-derived monomer resins can be used with emulsion polymerized acrylate pressure-sensitive adhesives, most of these tackifying resins are unsuitable for use in in situ polymerized acrylate pressure-sensitive adhesives.

Although acrylate adhesives generally have a good balance of tack, peel, and shear properties, an increase in these properties is desirable for the more demanding applications such as, for example, those applications requiring adhesion to low energy substrates such as polyethylene and polypropylene, and high solids automotive paint systems which are coming into widespread use to reduce air pollution. The tack property relates to the adhesive's ability to adhere quickly, the peel property relates to the adhesive's ability to resist removal by peeling, and the shear property relates to the adhesive's ability to hold in position when shear forces are exerted. Generally, the tack and peel properties are directly related to each other but are inversely related to the shear property. Typically, tackifying agents yield a 30% increase in adhesion, however, if an adhesive is modified to increase tack, its resistance to shear is lowered, and commonly an increase in shear resistance is accompanied by a reduction in tack. (See U.S. Pat. No. 4,077,926, Sanderson et al.)

SUMMARY OF THE INVENTION

The invention provides a tackified pressure-sensitive adhesive comprising (a) about 50 to 95 parts by weight of an ultraviolet radiation polymerized polymer of (i) one or more monomers which are predominantly alkyl acrylate, the alkyl groups of which have an average of 4 to 12 carbon atoms and (ii) about 0 to 15 parts by weight of one or more strongly polar copolymerizable monomers or about 0 to 30 parts by weight of one or more moderately polar copolymerizable monomers; and (b) about 5 to 50 parts by weight of (poly) t-butyl styrene type tackifying resins, which have a number average molecular weight of about 300 to 2500, preferably about 900 to 2000, more preferably about 1100 to 1300, a polydispersity index of less than about 5, preferably less than about 2, and more preferably less than about 1.5, a glass transition temperature of about 40° to 120° C., preferably about 60° to 80° C., more preferably about 60° to 70° C., and a solubility parameter of about 7 to 9.5 $(cal/cc)^{-1/2}$, preferably about 8 to 9 $(cal/cc)^{-1/2}$, more preferably about 8 to 8.5 $cal/cc)^{-1/2}$, such adhesive having a monomer conversion factor of at least about 98%, more preferably about 100%.

The adhesive also has an improved peel strength over a comparable untackified adhesive, preferably demonstrating an increase of at least about 100%, more preferably about 200%. The adhesive has good storage stability, i.e., it retains at least about 70% of its peel adhesion after aging for a period of two weeks at 70° C.

In preferred embodiments of the invention, e.g., when the adhesive comprises the specified tackifying resin and the polymerized polymer of an alkyl acrylate and a moderately polar copolymerizable monomer, such as N-vinyl pyrrolidone, excellent shear strength, i.e., preferably at least about 100 min., more preferably at least about 500 minutes, and most preferably at least about 10,000 minutes, can be obtained.

The term (poly) t-butyl styrene type tackifying resins includes (poly) t-butyl styrenes and functionalized (poly) t-styrenes.

DETAILED DESCRIPTION OF THE INVENTION

The alkyl acrylate monomers useful in this invention are preferably monofunctional unsaturated acrylate ester monomers. Included within this class of monomers are, for example, isooctyl acrylate, 2-ethyl hexyl acrylate, decyl acrylate, dodecyl acrylate, butyl acrylate and hexyl acrylate. The alkyl acrylate monomers can be used to form homopolymers for the ultraviolet radiation polymerized polymer or they can be copolymerized with polar copolymerizable monomers. When strongly polar copolymerizable monomers are copolymerized with the alkyl acrylate monomer, the strongly polar copolymerizable monomer generally comprises about 0 to 15 parts by weight of the ultraviolet radiation polymerized polymer and the alkyl acrylate monomer generally comprises at least about 85 parts by weight of the ultraviolet radiation polymerized polymer. When moderately polar copolymerizable monomers are copolymerized with the alkyl acrylate monomer, the moderately polar copolymerizable monomer generally comprises about 0 to 30 parts by weight of the ultraviolet radiation polymerized polymer and the alkyl acrylate monomer generally comprises at least about 70 parts by weight of the ultraviolet radiation polymerized polymer.

The polar copolymerizable monomers can be selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers such as N-vinyl pyrrolidone, N-vinyl caprolactam, acrylonitrile, vinyl chloride, vinylidene chloride, or diallyl phthalate. The strongly polar copolymerizable monomer preferably comprises up to about 15 parts by weight, more preferably about 2 to 5 parts by weight, of 100 parts of the ultraviolet radiation polymerized polymer. The moderately polar copolymerizable monomer preferably comprises up to about 30 parts by weight, more preferably 5 to 30 parts by weight, of 100 parts of the ultraviolet radiation polymerized polymer. Generally, when greater amounts of moderately polar copolymerizable monomer, i.e., approaching 15 parts by weight, are used, a good balance of adhesive properties can be achieved using greater amounts of tackifying resin, although for a given system, adhesive properties are diminished with excessive amounts of tackifying resin in the system. The maximum relative amounts of components can be readily determined with minimal experimentation.

The polymerizable composition may further include nonpolar or slightly polar copolymerizable monomers such as butadiene or isoprene as long as such monomers do not interfere with the properties of the polymer.

The tackifying resins useful in this invention are (poly) tertiary-butyl styrenes which contain an aromatic component. The aliphatic polymeric resins or the aliphatic component of the polymeric resins containing both aliphatic and aromatic components is derived from C-5 or (C-5)$_2$ monomer fractions as described in Satas, *Handbook of Pressure Sensitive Adhesive Technology,* Van Nostrand Reinhold Co., New York, 1982, pp. 353–369.

Generally, the tackifying resin comprises about 5 to 50 parts by weight, preferably about 15 to 35 parts by weight of 100 parts of the pressure-sensitive adhesive.

The aliphatic component preferably comprises about 40 to 60 weight percent of the tackifying resin with the aromatic component comprising about 60 to 40 weight percent. Most preferably the tackifying resin contains about 50 weight percent of the aromatic component and about 50 weight percent of the aliphatic component.

The desired ratios of aromatic component to aliphatic component can be obtained by copolymerizing in appropriate proportions. The desired ratio of aromatic component to aliphatic component can also be obtained by partial hydrogenation of an aromatic homopolymer to lower the aromatic content. Partial hydrogenation of a polymer containing both aliphatic and aromatic components and having an undesirably high aromatic content can also be carried out to achieve the desired ratio of aromatic component to aliphatic component. For example, styrene or alkylated styrene monomers can be copolymerized with aliphatic monomers such as cis- and/or trans-piperylene and/or terpene hydrocarbons such as α-pinene and β-pinene. These copolymers can then be partially hydrogenated to increase the aliphatic content.

The poly(t-butyl styrene) (TBS) tackifying resin should have a number average molecular weight (Mn) of about 300 to 2500, preferably about 900 to 2000, more preferably about 1100 to 1300. When the molecular weight of the TBS tackifying resin is too low, the adhesive generally exhibits poor shear properties, especially at high temperature. To compensate for such a reduction in shear properties, larger amounts of crosslinking agents can be added to the adhesive composition prior to polymerization, but this then usually results in a significant reduction in peel strength of the adhesive. When the molecular weight of the TBS tackifying resin is too high, the resin may have reduced compatibility with the acrylate monomers resulting in phase separation of the tackifying resin from the acrylate monomers. Further, when the molecular weight of the tackifying resin is too high, the adhesive may be so firm that a reduction in tack occurs.

The TBS tackifying resin should have a polydispersity index of less than about 5, preferably less than about 2, more preferably less than about 1.5. When the polydispersity index is too high, the tackifying resin may contain molecular weight fractions which are incompatible with the acrylate polymer and which may phase separate from the polymer. The polydispersity index ($P_i$) is calculated using the formula:

$$P_i = \frac{\text{weight average molecular weight}}{\text{number average molecular weight}}.$$

The glass transition temperature ($T_g$) of the tackifying resin should be about 40° to 120° C., preferably about 60° to 80° C., more preferably about 60° to 70° C. When the $T_g$ is too low, the adhesive becomes too soft resulting in a lack of cohesive strength. When the $T_g$ is too high, the tackifying resin may reduce the tack of the adhesive to the extent that adhesive properties are lost. It is generally preferred that the $T_g$ of the tackifying resin be such that when a mixture of the tackifying resin and the acrylate polymer is analyzed for $T_g$ by differential scanning calorimetry, a single peak is exhibited by the mixture indicating miscibility, although some tackifying resins which exhibit only slight immiscibility with the acrylate polymer are also useful in the present invention.

The TBS tackifying resins have a solubility parameter (δ) of about 7 to 9.5 $(cal/cc)^{-\frac{1}{2}}$, preferably about 8 to 9 $(cal/cc)^{-\frac{1}{2}}$, more preferably about 8 to 8.5 $(cal/cc)^{-\frac{1}{2}}$. When the solubility parameter is too low or too high, compatibility of the tackifying resin with the acrylate polymer decreases to the extent that the tackifying resin and the acrylate phase separate resulting in a loss in adhesive properties.

The TBS tackifying resins also cause minimal inhibition of the ultraviolet curing of the adhesive, i.e., the resin does not act as a chain terminator during polymerization of the acrylate monomers. Thus, TBS resins having groups which will act as chain terminators are not useful. For example, cationically polymerized t-butyl styrene which has end-group olefinic unsaturation, active hydrogen atoms, and halogen catalyst residues is unsuitable, while anionically polymerized t-butyl styrene in which these functional groups are not present is suitable.

The TBS tackifying resin permits the acrylate monomer mixture to polymerize with a conversion factor of acrylate monomer to polymer in the presence of the tackifying resin of at least about 98%, most preferably abott 100% when a 125-micron thick layer of the adhesive composition, i.e., the acrylate monomer, the optional polar copolymerizable monomer, the tackifying agent, and the photoinitiator is coated between two 50-micron thick polyethylene terephthalate films having release coatings thereon and the coated adhesive is polymerized using ultraviolet radiation at a rate of 1 milliwatt per second per square centimeter ($mW/sec/cm^2$) for a period of about 2 minutes. The conversion factor, i.e., the extent of polymerization, can be monitored by measuring the refractive index of the polymerized mixture. For example, the refractive index may change from about 1.43 for a partially polymerized monomer mixture to about 1.50 at about 100% reaction. The change in refractive index occurs linearly with conversion of the unsaturated moieties. See, for example, discussions about the method in *Polymerization at Advanced Degrees of Conversion*, G.P. Gladyshev and K. M. Gibov, Keter Press, Jerusalem 1970, pp. 20–28.

The tackifying resin must permit formation of a storage stable adhesive. Many such resins result in adhesives which lose their adhesion when aged. Tackifying resins useful in compositions of the invention are those wherein the resultant adhesive composition loses no more than 70% of its peel adhesion, as measured by the 180° Peel test described herein, after a period of two weeks at 70° C. This heat aging simulates storage for two years at room temperature.

The mixture of the alkyl acrylate monomer, the polar copolymerizable monomer, if present, and the tackifying resins also contain a photoinitiator to aid in polymerization of the monomers. Photoinitiators which are useful for polymerizing the acrylate monomer and the optional polar copolymerizable monomer include the benzoin ethers such as benzoin methyl ether or benzoin isopropyl ether, substituted benzoin ethers such as anisoin methyl ether, substituted acetophenones such as 2,2-diethoxyacetophenone and 2,2-dimethoxy-2-phenylacetophenone, substituted alpha-ketols such as 2-methyl-2-hydroxypropiophenone, aromatic sulfonyl chlorides such as 2-naphthalenesulfonyl chloride, and photoactive oximes such as 1-phenyl-1,1-propanedione-2-(o-ethoxycarbonyl)oxime. Generally, the photoinitiator is present in an amount of about 0.01 to 1 weight percent based on the weight of the monomers and tackifying agent.

The mixture of the polymerizable monomers and the tackifying resin may also contain a crosslinking agent to increase the shear strength of the adhesive. Useful crosslinking agents include substituted triazines such as 2,4-bis(trichloromethyl)-6-p-methoxystyryl-s-triazine and the chromophore-substituted halomethyl-s-triazines disclosed in U.S. Pat. Nos. 4,329,384 and No. 4,330,590 (Vesley), incorporated herein by reference. Other useful crosslinking agents include multi-functional alkyl acrylate monomers such as trimethylolpropane triacrylate, pentaerythritol tetracrylate, 1,2-ethylene glycol diacrylate, 1,6-hexanediol diacrylate, and 1,12-dodecanediol diacrylate. Each of the crosslinking agents is useful in the approximate range of 0.01 to 1 weight percent of the total weight of the monomers and tackifying agent. The adhesive layer is usually sufficiently crosslinked when, on attempting to dissolve in heptane, the insoluble gel fraction exceeds 40%.

Where a foam-like pressure-sensitive adhesive tape is desirable, a monomer blend containing microspheres may be used, as disclosed in U.S. Pat. No. 4,855,170, incorporated herein by reference. Especially preferred microspheres are polymeric microspheres such as those described in U.S. Pat. Nos. 3,615,972, 4,075,238, and 4,287,308, all of which are incorporated herein by reference. The microspheres are available from Kema Nord Plastics under the trade name "Expancel" and from Matsumoto Yushi Seiyaku under the trade name "Micropearl". In expanded form, the microspheres have a specific density of approximately 0.02–0.036 g/cc. It is possible to include the unexpanded microspheres in the pressure-sensitive adhesive composition and subsequently heat them to cause expansion, but it is generally preferred to mix the expanded microspheres into the adhesive. This process makes it easier to ensure that the hollow microspheres in the final adhesive are substantially surrounded by at least a thin layer of adhesive.

Polymeric microspheres having an average diameter of 10 to 200 micrometers may be blended into the polymerizable composition in amounts of from about 15% to about 75% by volume prior to coating.

Also useful are glass microspheres having an average diameter of from 5 to 200 micrometers, preferably from about 20 to about 80 micrometers. Such microspheres may comprise 5% to 65% by volume of the pressure-sensitive adhesive. The pressure-sensitive adhesive layer should be at least 3 times as thick as the diameter of the glass microspheres, preferably at least 7 times.

Useful glass microspheres include colored microspheres such as those disclosed in U.S. Pat. Nos. 4,612,242, (Vesley et al.), 4,618,242, (Chamberlain et al.) and 4,666,771, (Vesley et al.), all of which are incorporated herein by reference.

Other materials which can be blended with the polymerizable monomer/TBS tackifying resin mixture include plasticizers, coloring agents, reinforcing agents, fire retardants, and foaming agents.

The pressure-sensitive adhesive of the invention is preferably prepared by premixing together the polymerizable monomers, i.e., the alkyl acrylate monomer and the polar copolymerizable monomer, if used, and photoinitiator. This premix is then partially polymerized to a viscosity in the range of about 500 to 50,000 cps to achieve a coatable syrup. Alternatively the monomers can be mixed with a thixotropic agent such as fumed silica to achieve a coatable syrup. The tackifying resin is then dissolved into this syrup. Additional photoinitiator and optional photocrosslinking agent may also be dissolved into the syrup.

This composition is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps which generally have an intensity of about one watt per lineal inch (1 watt per 2.54 lineal centimeters). If, instead of covering the polymerizable coating, the photopolymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), incorporated herein by reference, which also teaches that by doing so, thick coatings can be polymerized in air.

Where multilayer tape constructions are desirable, a preferred method of construction is multilayer coating, as described in U.S. Pat. Nos. 4,818,610, 4,895,738 (Zimmerman et al.), and 4,894,259 (Kuller), all of which are incorporated herein by reference, wherein a plurality of copolymerizable coatable compositions is prepared, each composition containing at least one photopolymerizable monomer, one of the coatable composition being the novel pressure-sensitive adhesive of the invention. The coatable compositions are coated to provide a plurality of superimposed layers with contiguous layers defining an interface therebetween, with the novel pressure-sensitive adhesive terpolymer of the invention being coated as a first or last layer. Migration of photopolymerizable monomers through the interface between contiguous layers is permitted, and the superimposed layers are then simultaneously irradiated. This provides polymeric chains comprised of copolymers of photopolymerizable monomers originating from contiguous layers extending through the interface therebetween, thereby producing a tape having layers which cannot be delaminated.

The various modifications and alterations of this invention will be apparent to those skilled in the art without departing from the scope and spirit of this invention and this invention should not be restricted to that set forth herein for illustrative purposes.

Test procedures used in the examples to evaluate pressure-sensitive adhesives include the following:

Monomer Conversion Test

The refractive indices of the unpolymerized monomer, i.e., 0% conversion, ($RI_m$), the fully polymerized monomer, i.e., 100% conversion, ($RI_p$), and the sample on which conversion is to be determined ($RI_s$), are measured using a Bausch and Lomb Refractometer Model No. 33.45.71 at 30° C. The percent conversion is calculated using the formula:

$$\frac{RI_s - RI_m}{RI_p - RI_m} \times 100 = \% \text{ conversion}$$

180° Peel Adhesion Test

One side of the adhesive sample is laminated to a 0.05 mm thick aluminum foil backing. Strips of the foil-laminated adhesive are cut to form pressure-sensitive adhesive tape 2.54 cm in width. A 15 cm long piece of the tape is adhered to a 5 cm wide, 12.7 cm long sheet of test substrate such as stainless steel, polypropylene, or acrylonitrile/butadiene/styrene with a free end of the tape extending beyond the end of the test substrate. The sample is rolled twice with a 2-kg hard rubber roller to ensure contact between the adhesive and the test substrate. The free end of the tape is attached to a scale and the tape is removed from the test substrate by moving the test substrate at a rate of 30.5 cm/min.

Aging Test (Storage Stability)

This test is identical to the 180° Peel Adhesion, performed after the sample has been stored for two weeks at 70° C., a simulation of 2 years storage at room temperature.

Breakaway/Continuous Peel Test

A 12.7 mm×200 mm pressure-sensitive adhesive transfer tape, carried on a release liner, is aligned squarely over the 15 mm×150 mm face of a rigid polyvinyl chloride test bar about 6 mm thick and pressed firmly into place by rolling once with a 6.8 kg roller. The liner is then removed from the tape, and the exposed adhesive surface aligned in the center of a freshly painted steel panel approximately 100 mm×300 mm, with one end of the test bar extending beyond the end of the panel. After rolling the test bar with a 6.8 kg (15 pound) roller at the rate of about 300 mm/minute to ensure good contact, the specimen is allowed to age for any desired period of time and then trimmed to a width of approximately 50 mm. The specimen is then clamped in a horizontal fixture mounted in the lower jaw of a tensile testing machine. A metal bar approximately 8 mm thick and having an opening at one end corresponding to the cross section of the vinyl test bar is slipped over the extended end of the test bar, and the opposite end gripped in the upper jaw of the tensile testing machine. The jaws are then separated at 30.5 cm/minute, noting both the force ("Breakaway Peel Value") required to initiate separation of the vinyl test bar from the painted panel and the force ("Continuous Peel Value") required to continue the separation until the bar is completely removed.

Shear Test

A strip of tape is adhered by its adhesive to a stainless steel plate under the weight of a 2-kg hard rubber roller with a free end of the tape extending beyond the plate and the adhesive contact area being 2.54 cm×2.54 cm. After 30 minutes, the plate is placed in an oven preheated to 70° C. and positioned 2° from the vertical to prevent peeling. After 10 minutes in the oven, a 1 kg mass is suspended from the free end, and the time at which the mass falls is noted. Alternatively, the sample may be conditioned at room temperature (about 22° C.) for 30 minutes, then suspending the 1 kg mass from the free end of the tape, and noting the time at which the mass falls. The test is discontinued if the tape has not failed after 10,000 minutes.

To further illustrate this invention, the following nonlimiting examples are provided. In these examples, all percentages and parts are by weight unless otherwise indicated.

The (poly) t-butyl styrene tackifying resin used in the following examples was prepared as follows:

To a dry, two-necked, 1-liter, round-bottomed flask were added 500 ml of dry cyclohexane under an inert argon atmosphere. The cyclohexane was then titrated for proton donating impurities, e.g., water, alcohol, etc., by the addition of $5\times10^{-5}$ moles of 1,1-diphenylethylene. Sec-butyl lithium initiator (1.4M in hexane) was slowly added dropwise until a permanent faint yellow color became evident and this solution was stirred for one hour. The solution was then back-titrated with cyclohexane containing a trace amount of water until the yellow color disappeared. Under an inert argon atmosphere, 47.6 mls additional sec-butyl lithium initiator (1.4M in hexane) were then added to the flask. A water bath was placed under the flask and 114.9 g of dry t-butyl styrene were added to the flask. Polymerization began as evidenced by a reaction exotherm and the solution becoming bright red-orange in color due to carbanion formation. The reaction temperature rose to 60° C. and was held at 60° C for one hour to produce a deep red t-butyl styrene polymer solution. A 10-percent molar excess of methanol based on the sec-butyl lithium concentration used for polymerization was added to the solution and allowed to react to convert the t-butyl styryl lithium end groups at the terminal portions of the polymer chains to hydrogen atoms. The t-butyl styrene polymer was isolated by precipitation in methanol, washed with water, and vacuum dried to give a 95% yield of a dry, white, powdery solid having a number average molecular weight of 1200, a polydispersity index of 1.11, and a glass transition temperature of 65° C.

An acrylate-terminated t-butyl styrene polymer was prepared as follows:

A solution of t-butyl styrene polymer having t-butyl styryl lithium end groups was prepared as described above. Dry ethylene oxide gas was bubbled through the solution to convert the t-butyl styryl lithium end groups to lithium alkoxide end groups. Dry acryloyl chloride (4 ml) was added to the resultant solution to convert the lithium alkoxide end groups to acrylate end groups. This polymer solution was allowed to stand overnight to permit precipitation of the lithium chloride by-product and then filtered to remove the salt. The solution was further evaporated under vacuum yielding a yellow solid product. This product was washed three times with excess hot (60° C.) methanol in a blender and filtered. Drying overnight at 40° C. in a vacuum oven yielded 53.5 g (88% isolated yield) of a cream colored solid having a number average molecular weight of 1700, a polydispersity index of 1.41, and a glass transition temperature of 84° C.

A carboxylic acid-terminated t-butyl styrene polymer was prepared as follows:

A solution of t-butyl styrene polymer having t-butyl styryl lithium end groups was prepared as described above. Half of this solution was added to a cold (−70° C.) slurry of Dry Ice TM ($CO_2$) in tetrahydrofuran and reaction was allowed to occur as the solution came to room temperature. A 1% solution of hydrochloric acid in methanol was added to convert the lithium carboxylate to a carboxylic acid end group. The product was isolated by precipitation in methanol, washed with water, and vacuum dried to produce 47 g of a dry, powdery, white solid having a number average molecular weight of 1250, a polydispersity index of 1.11, and a glass transition temperature of 65° C.

A hydroxyl-terminated t-butyl styrene polymer was prepared as follows:

A deep red solution of t-butyl styrene polymer having t-butyl styryl lithium end groups was prepared as described above. Dry ethylene oxide gas was bubbled through the solution to provide the polymer with alkoxide end groups. A 1% solution of hydrochloric acid in methanol (5 ml) was then added to the solution to convert the alkoxide end groups to alcohol end groups. The product was isolated by precipitation in methanol, washed with water, and vacuum dried to give a 96% yield of a powdery, white solid having a number average molecular weight of 1200, a polydispersity index of 1.13, and a glass transition temperature of 62° C.

EXAMPLE 1

A premix was prepared using 80 parts isooctylacrylate (IOA), 20 parts N-vinylpyrrolidone (NVP), and 0.04 parts 2,2-dimethoxy -2-phenylacetophenone photoinitiator (Irgacure TM 651, available from Ciba-Geigy Corp.). This was partially polymerized by exposure to ultraviolet radiation to provide a coatable syrup having a viscosity of about 3000 cps. A blend of 75 parts of the partially polymerized premix, 25 parts of anionically polymerized t-butyl styrene (TBS), 0.15 parts of Hexanedioldriacrylate and an additional 0.2 parts Irgacure TM 651 was coated onto a first biaxially-oriented 0.05 mm thick low-adhesion release coated polyethylene terephthalate (PET) film and covered by a second such film at a knife setting which was adjusted to squeeze the syrup to provide a uniform coating of about 0.127 mm thick. The thus-prepared composite was then exposed to a bank of Sylvania TM ultraviolet fluorescent lamps to provide a total ultra-violet radiation exposure of 450 mjoules.

This was then tested according to the test methods listed above and the results are shown in Tables I, II and III.

COMPARATIVE EXAMPLE C1

This was prepared in the same manner as Example 1 except no tackifying resin was used. This was also tested in the same manner and the results are also shown in Tables I, II and III.

Comparative Examples C2–C4

These were prepared as Example 1 except other tackifying resins such as those listed in Table I were used. These were also tested in the same manner and the results are shown in Tables I, II and III.

TABLE I

| Example | Tackifying resin | Mn | $P_i$ | $T_g$(°C.) | (cal/cc)$^{-\frac{1}{2}}$ |
|---|---|---|---|---|---|
| 1 | TBS[a] | 1200 | 1.11 | 65 | 8.0 |
| C2 | F85[b] | 740 | 1.14 | 40 | 9.4 |
| C3 | 7115[c] | 450 | 1.96 | 60 | 7.8 |
| C4 | A-135[d] | 550 | 1.60 | 98 | 7.8 |

[a]anionically polymerized poly(t-butyl styrene) resin
[b]Foral 85 TM, a highly hydrogenated rosin-ester of glycerol available from Hercules, Inc.
[c]Zonarez 7115 TM, a terpene hydrocarbon available from Arizona Chemical Company
[d]Piccolyte A135 TM, a resin derived from d-limonene available from Hercules, Inc.

The conversion factors were determined for each adhesive at the times set forth in Table II.

TABLE II

| Time (min) | Conversion (%) Example: C1 Tackifying resin: — | 1 TBS | C2 F85 | C3 7115 | C4 A135 |
|---|---|---|---|---|---|
| 0.25 | 27.4 | 29.1 | 11.7 | 9.0 | — |
| 0.50 | 96.1 | 84.4 | 27.7 | 12.1 | — |
| 0.75 | 98.8 | 98.5 | 41.8 | 15.6 | — |
| 1.0 | — | 99.3 | 52.0 | 20.1 | 11.4 |
| 1.5 | 99.7 | 99.6 | 67.6 | 28.0 | 12.6 |
| 2 | 100 | 100 | 78.3 | 34.7 | 14.2 |
| 2.5 | | | 85.9 | 41.1 | — |
| 3 | | | 90.1 | 45.0 | — |
| 4 | | | 94.7 | 63.2 | 20.2 |
| 5 | | | 96.2 | 73.9 | — |

As can be seen from the data in Table II, the tackifying resins of Example 1 did not substantially inhibit the polymerization of the monomer mixtures, the monomers of each of these examples having a conversion factor of at least 98% when exposed to 120 mj of ultraviolet radiation at a rate of 1 mWatt/cm²/sec for 2 mintues. The adhesives of Comparative Examples C2–C4 exhibited conversion factors only of 78%, 34%, and 14%, respectively.

TABLE III

| Ex. | Premix IOA (parts) | Premix NVP (parts) | Adhesive composition Premix (parts) | Adhesive composition TBS (parts) | Adhesive composition HDDA (parts) | 180° Peel adhesion (N/dm) PP | 180° Peel adhesion (N/dm) ABS | Shear Strength SS | Shear Strength (min) |
|---|---|---|---|---|---|---|---|---|---|
| 1 | 80 | 20 | 75 | 25 | 0.15 | 182 | 185 | 193 | 2,370 |
| C1 | 80 | 20 | 100 | — | 0.15 | 67 | 72 | 42 | 530 |

EXAMPLES 2–4 AND COMPARATIVE EXAMPLE C5

Adhesives were prepared as in Examples 1–3, except that the TBS resins had a number average molecular weight of about 1200 and the end groups set forth in Table III, and that 0.16 weight percent hexanediol diacrylate crosslinking agent was added to the blend. Comparative Example C5 had no added tackifying resin. The adhesive blends were coated onto a 0.05 mm thick polyethylene terephthalate film at a thickness of 0.127 mm. The coated film was immediately subjected to 300 mj of ultraviolet radiation provided by a bank of Sylvania™ fluorescent lamps in an inert nitrogen atmosphere. The polymerized adhesives were tested for 180° peel adhesion to polypropylene film and for shear strength at 70° C. The results are set forth in Table IV.

TABLE IV

| Example | End group | 180° peel adhesion (N/dm) | Shear Strength (min) |
|---|---|---|---|
| 2 | —OCOCH=CH$_2$ | 144 | 106 |
| 3 | —COOH | 158 | 10,000 |
| 4 | —OH | 179 | 10,000 |
| C5 | — | 72 | 10,000 |

As can be seen from the data in Table IV, each of the TBS tackifier resins provided a significant increase in 180° peel adhesion and those resins having the —COOH or —OH end groups did not reduce the shear strength.

EXAMPLES 5-7 AND COMPARATIVE EXAMPLE C6

Adhesives were prepared as in Examples 2–4, except the monomer content of the premix was 97 parts isooctyl acrylate (IOA) and 3 parts acrylic acid (AA). Comparative Example C6 had no added tackifying resin. The adhesives were photopolymerized and tested as in Examples 2–4. The results are shown in Table V.

TABLE V

| Example | End group | 180° peel adhesion (N/dm) |
|---|---|---|
| 5 | —OCOCH=CH$_2$ | 92 |
| 6 | —COOH | 79 |
| 7 | —OH | 97 |
| C6 | — | 72 |

As can be seen from the data in Table V, the TBS tackifying resins provide an increase in peel adhesion.

EXAMPLES 8-18 AND COMPARATIVE EXAMPLES C7-C11

Adhesive compositions were prepared as in L Examples 2–4 except different amounts of tackifying resin (anionically polymerized t-butyl styrene) and different monomer ratios, as listed in Table VI were used. The compositions were coated on polyethylene terephthalate film and polymerized by ultraviolet radiation as in Examples 2–4 The adhesives were tested for 180° peel adhesion to polypropylene sheet (PP), a low energy surface, acrylonitrile/butadiene/styrene sheet (ABS), a moderate energy surface, and stainless steel (SS), a high energy surface, and for shear strength at 70° C. Comparative Examples C7–C11 were similarly prepared and tested except tackifying resin was added. The results together with the adhesive compositions are shown in Table VI.

TABLE VI

| | Premix | | Adhesive composition | | | 180° Peel adhesion (N/dm) | | | Shear |
|---|---|---|---|---|---|---|---|---|---|
| Ex. | IOA (parts) | NVP (parts) | Premix (parts) | TBS (parts) | HDDA (parts) | PP | ABS | SS | Strength (min) |
| 8 | 85 | 15 | 80 | 20 | 0.12 | 103 | 121 | 90 | 117 |
| 9 | 85 | 15 | 80 | 20 | 0.18 | 105 | 91 | 92 | 10,000+ |
| 10 | 85 | 15 | 70 | 30 | 0.12 | 186 | 193 | 201 | 38 |
| 11 | 85 | 15 | 70 | 30 | 0.18 | 182 | 193 | 190 | 67 |
| C7 | 85 | 15 | 100 | — | 0.12 | 71 | 79 | 82 | 68 |
| C8 | 85 | 15 | 100 | — | 0.18 | 64 | 54 | 30 | 44 |
| 12 | 80 | 20 | 75 | 25 | 0.09 | 175 | 186 | 184 | 96 |
| 13 | 80 | 20 | 75 | 25 | 0.15 | 182 | 185 | 193 | 2,370 |
| C9 | 80 | 20 | 100 | — | 0.15 | 67 | 72 | 42 | 530 |
| 14 | 80 | 20 | 75 | 25 | 0.21 | 162 | 151 | 166 | 10,000+ |
| 15 | 75 | 25 | 80 | 20 | 0.12 | 164 | 162 | 168 | 6,000 |
| 16 | 75 | 25 | 80 | 20 | 0.18 | 158 | 166 | 175 | 10,000+ |
| 17 | 75 | 25 | 70 | 30 | 0.12 | 188 | 70 | 72 | 109 |
| 18 | 75 | 25 | 70 | 30 | 0.18 | 149 | 109 | 48 | 8,000 |
| C10 | 70 | 30 | 100 | — | 0.12 | 85 | 67 | 54 | 10,000+ |
| C11 | 70 | 30 | 100 | — | 0.18 | 91 | 53 | 48 | 10,000+ |

As can be seen from the data in Table VI, increasing the amount of tackifying resin generally increases the 180° peel adhesion, but reduces the shear strength of the adhesive. The shear strength can generally be increased by increasing the amount of N-vinyl pyrrolidone (NVP) in the premix and/or increasing the amount of crosslinking agent.

EXAMPLES 19-26 AND COMPARATIVE EXAMPLES C12-C14

Premixes were prepared containing isooctyl acrylate (IOA) and acrylic acid (AA) in the amounts set forth in Table VII. To each premix was added 0.04 parts Irgacure™ 651 photoinitiator and the premix was polymerized to a coatable viscosity of about 1000 cps. Into the partially polymerized premixes were dissolved 0.2 parts additional Irgacure™ 651 and varying amounts of anionically polymerized TBS and hexanediol diacrylate crosslinking agent (HDDA) in the amounts set forth in Table VII. The thus-prepared compositions were coated onto polyethylene terephthalate film and polymerized in nitrogen atmosphere using ultraviolet radiation as in Examples 2–4 except that ultraviolet radiation at a rate of 2 mW/sec/cm$^2$ was used. The thus-prepared adhesives were tested for 180° peel adhesion to polypropylene sheet (PP), acrylonitrile/-butadiene/styrene sheet (ABS), and stainless steel (SS) and for shear strength at 70° C. The results are set forth in Table VII. Comparative Examples, C12–C14 prepared without the addition of the t-butyl styrene tackifying resin were also tested for peel adhesion and shear strength, the results of which are set forth in Table VII.

TABLE VII

| | Premix | | Adhesive composition | | | 180° Peel adhesion (N/dm) | | |
|---|---|---|---|---|---|---|---|---|
| Example | IOA (parts) | AA (parts) | Premix (parts) | TBS (parts) | HDDA (parts) | PP | ABS | SS |
| 19 | 97 | 3 | 80 | 20 | 0.15 | 67 | 81 | 19 |
| 20 | 97 | 3 | 70 | 30 | 0.15 | 140 | 142 | 142 |
| C12 | 97 | 3 | 100 | — | 0.15 | 64 | 68 | 38 |
| 21 | 97 | 3 | 70 | 30 | 0.25 | 102 | 94 | 77 |
| 22 | 96 | 4 | 85 | 15 | 0.20 | 70 | 70 | 70 |
| 23 | 96 | 4 | 75 | 25 | 0.20 | 131 | 98 | 142 |
| 24 | 96 | 4 | 65 | 35 | 0.20 | 114 | 101 | 156 |
| C13 | 96 | 4 | 100 | — | 0.20 | 56 | 55 | 46 |
| 25 | 95 | 5 | 80 | 20 | 0.25 | 86 | 90 | 70 |
| 26 | 95 | 5 | 70 | 30 | 0.25 | 79 | 92 | 91 |
| C14 | 95 | 5 | 100 | — | 0.25 | 52 | 69 | 53 |

As can be seen from the data in Table VII, an increase in the amount of tackifying resin generally increases the 180° peel adhesion of the adhesive. Increasing the amount of the acrylic acid and/or the crosslinking agent tends to reduce the 180° peel adhesion.

EXAMPLES 27-28 AND COMPARATIVE EXAMPLES C15-C16

In Examples 27-28 premixes were prepared containing isooctyl acrylate (IOA) and N-vinyl pyrrolidone (NVP) in the amounts set forth in Table VIII. To each premix was added 0.04 parts Irgacure™ 651 photoinitiator and the premix was polymerized to a coatable viscosity of about 1000 cps. Into the partially polymerized premixes were dissolved 0.1 part additional Irgacure™ 651 photoinitiator, 8 parts glass microbubbles, 0.21 parts hexanediol diacrylate, and 20 parts anionically polymerized TBS. The resulting mixture was thoroughly mixed with an air stirrer, degassed in a desiccator using a vacuum pump, and fed to the nip of a knife coater between a pair of transparent, biaxially-oriented polyethylene terephthalate films, the facing surfaces of which had low-adhesion coatings. The knife coater was adjusted to provide a coating thickness of approximately 1 mm. The composite emerging from the knife coater was exposed to ultraviolet radiation as in Examples 2-4. After peeling off one of the transparent films covering the resultant foam-like pressure-sensitive adhesive to provide a transfer tape, the transfer tape was tested for breakaway peel value and continuous peel value using a steel panel having duPont RK-3841™ basecoat/clearcoat high solids flexible urethane high-solids automotive paint freshly painted thereon. In Comparative Examples C15 and C16 were prepared and tested as in Examples 27-28 except no tackifying agent was added. The results are set forth in Table VIII.

TABLE VIII

| | Premix | | | Breakaway | Continuous |
|---|---|---|---|---|---|
| Example | IOA (parts) | NVP (parts) | TBS (parts) | peel value (N/dm) | peel value (N/dm) |
| 27 | 80 | 20 | 25 | 1197 | 422 |
| C15 | 80 | 20 | — | 810 | 246 |
| 28 | 75 | 25 | 20 | 1232 | 422 |
| C16 | 75 | 25 | — | 1021 | 317 |

EXAMPLES 29-32

Transfer tapes were prepared as in Examples 27-28 using the amounts of isooctylacrylate (IOA), n-vinyl pyrrolidone (NVP), and anionically polymerized TBS set forth in Table IX. The transfer tapes were tested for breakaway peel value and continuous peel value using steel panels having PPG DC-2000™ basecoat/clearcoat (Examples 29-30) or Ford 50J107A™ enamel high solids automotive paint freshly painted thereon. The results are set forth in Table IX.

TABLE IX

| Example | IOA (parts) | NVP (parts) | TBS (parts) | Breakaway peel value (N/dm) | Continuous peel value (N/dm) |
|---|---|---|---|---|---|
| 29 | 80 | 20 | 25 | 1162 | 352 |
| 30 | 75 | 25 | 20 | 1126 | 405 |
| 31 | 80 | 20 | 25 | 1267 | 440 |
| 32 | 75 | 25 | 20 | 1162 | 510 |

EXAMPLES 32-34 AND COMPARATIVE EXAMPLES C16-C22

Adhesive compositions were prepared as in Example 1, except that different amounts of various tackifier resins were used. The compositions were tested for 180° peel adhesion to polypropylene, a low energy surface, both initially and after two weeks at 70° C. As can be seen from the data in Table X, the compositions of the invention either built adhesion or lost insignificant amounts of adhesion. Compositions made with other types of tackifier resins lost at least 50% of their adhesion, with some losing 100% of their adhesion to become tack-free.

TABLE X

| | | | 180° Peel Adhesion* | | |
|---|---|---|---|---|---|
| Example No. | Tackifying Resin Mfg. | WT. % Resin | Initial (N/dm) | 14 days @ 70° C. (N/dm) | % Adhesion Loss |
| | Regalrez™ | | | | |
| C17 | 3102 | 16.6 | 166 | 79 | −52.6% |
| C18 | 3102 | 20 | 232 | 94 | −59.4% |
| C19 | 3102 | 30 | 289 | 74 | −74.2% |
| | Regalrez™ | | | | |
| C20 | 6108 | 30 | 169 | Tack Free | −100% |
| C21 | 6108 | 40 | 140 | Tack Free | −100% |
| C22 | 6108 | 46.8 | 140 | Tack Free | −100% |
| 32 | poly t-butyl styrene | 20 | 164 | 158 | −4% |
| 33 | poly t-butyl styrene | 25 | 182 | 184 | +1.2% |
| 34 | poly t-butyl styrene | 30 | 186 | 188 | +1.2% |

*12"/min from polypropylene

What is claimed is:

1. A pressure-sensitive adhesive comprising the reaction product resulting from the photopolymerization of a solution comprising the following:

(i) at least about 70 parts by weight of one or more monomers which are predominately alkyl acrylate, the alkyl groups of which have an average of 4 to 12 carbon atoms;

(ii) about 0 to 15 parts by weight of one or more strongly polar copolymerizable monomers or about 0 to 30 parts by weight of one or more moderately polar copolymerizable monomers;

(iii) about 5 to 50 parts by weight of a tackifier consisting essentially of a (poly)tert-butyl styrene tackifying resin which:

(A) comprises from about 40 to 60 weight percent of an aliphatic component and from about 60 to 40 weight percent of an aromatic component; said aliphatic component being derived from aliphatic C-5 or $(C\text{-}5)_2$ monomeric hydrocarbon fractions and said aromatic component being derived from $C_9$ monomeric hydrocarbon fractions;

(B) has a number average molecular weight of about 300 to 2500;

(C) has a glass transition temperature of about 40° to 120° C.;

(D) has a polydispersity index of less than about 5; and (E) has a solubility parameter of about 7 to 9.5 $(cal/cc)^{\frac{1}{2}}$; and (iv) from about 0.1 to 1 weight percent of a photoinitiator based upon the total weight of the polymerizable monomers and tackifying resin;

wherein at least about 98% by weight of said monomers (i) and (ii) present in the reaction solution undergo copolymerization during the photopolymerization reaction and said pressure-sensitive adhesive loses no more than about 70% of its adhesion when aged for a period of two weeks at 70° C.

2. The pressure-sensitive adhesive of claim 1 wherein said adhesive further comprises a crosslinking agent.

3. The pressure-sensitive adhesive of claim 2 wherein said crosslinking agent is present in an amount of about 0.01 to 1 weight percent based on the weight of the polymerizable monomers and tackifying agent.

4. The pressure-sensitive adhesive of claim 1 wherein said adhesive further comprises microbubbles.

5. The pressure-sensitive adhesive of claim 4 wherein said microbubbles comprise 5 to 65 volume percent of the adhesive.

6. The pressure-sensitive adhesive of claim 5 wherein said microbubbles have an average diameter of 10 to 200 micrometers.

7. A pressure-sensitive adhesive tape comprising a flexible carrier web having the pressure-sensitive adhesive of claim 1 adhered to at least one surface of said web.

8. A pressure-sensitive adhesive transfer tape comprising a flexible carrier web having the pressure-sensitive adhesive of claim 1 releasably adhered to one surface of said web.

* * * * *